United States Patent

[11] 3,588,603

| [72] | Inventor | Thomas E. Slugantz<br>Versailles, Ky. |
|---|---|---|
| [21] | Appl. No. | 777,586 |
| [22] | Filed | Nov. 21, 1968 |
| [45] | Patented | June 28, 1971 |
| [73] | Assignee | Texas Instruments Incorporated<br>Dallas, Tex. |

[54] PROTECTIVE APPARATUS
10 Claims, 3 Drawing Figs.

[52] U.S. Cl. .................................................. 317/9
[51] Int. Cl. .................................................. H02h 3/00
[50] Field of Search ...................................... 317/9, 18,
18 (B), 33, 43; 307/94, 127, 125; 320/25; 324/51

[56] References Cited
UNITED STATES PATENTS

| 2,999,189 | 9/1961 | Gerrard | 317/18(B) |
| 3,313,960 | 4/1967 | Borys | 307/94 |

*Primary Examiner*—Harold Broome
*Attorneys*—Harold Levine, Edward J. Connors, Jr., John A. Haug and James P. McAndrews ABSTRACT: Protective apparatus for disconnecting a power load from its source of electrical power if there is an open ground connection or if the load is improperly connected to the power source. The apparatus includes a triggerable semiconductor current switching device, e.g., a triac or an SCR, and a relay responsive to operation of the device with contacts normally connecting the load to the power source. The apparatus is connected to the power load to detect an open ground connection or improperly polarized power connection thereby to trigger the current switching device and thus open the contacts to protectively disconnect the load from the power source.

This invention relates to apparatus for detecting a faulty grounding circuit or a faulty wiring connection of a load to a power source, and more particularly to such apparatus which will automatically disconnect the load from the power source if there is either an open ground connection or an improperly polarized connection of the load to the source.

PATENTED JUN28 1971

3,588,603

Thomas E. Slugantz
Inventor

PROTECTIVE APPARATUS

There are many electrical appliances and machines used in both home and industry which require that the case or chassis of the appliance or machine be connected to ground. Such a ground connection insures against the possibility of a shock hazard which could occur because of a conductive path, or capacitive or inductive leakage, from the power connections of the appliance or machine to its case or chassis. If the case or housing is not grounded, then a lethal voltage may appear between the machine or appliance housing and earth ground. Because of this possibility, such appliances or machines are usually directly connected to a good earth ground by means of a third wire in the electrical outlet or an external ground wire. In addition to this requirement, some appliances and machines also require that the connection to an AC source of supply be correctly polarized to present the proper polarity for safe or proper operation. For example, in conventional two-wire AC household wiring systems, one wire is usually the so-called "hot" or high side connection, and the other is a neutral connection, i.e., is at ground potential. It is frequently required that an appliance or machine have a predetermined one of its terminals connected to the high side, and its other terminal connected to the neutral side of the supply. It is possible for there to be a "reversed" or improperly polarized connection because of a wiring error or through ignorance.

Accordingly, among the several objects of the present invention may be noted the provision of protective apparatus which will rapidly and safely disconnect a power load from a source of power if the load is faultily grounded; the provision of such apparatus which will disconnect the load if it is connected with improper polarity; the provision of such apparatus which is highly reliable; the provision of such apparatus which is relatively simple and inexpensive; and the provision of such apparatus which is compact. Other objects and features will be in part apparent and in part pointed out hereinafter.

Briefly, protective apparatus of this invention is operative to automatically disconnect a faultily grounded or improperly connected power load from a source of electrical power. It includes a triggerable semiconductor current switching device, e.g., a triac or an SCR, having main terminals and a gate terminal, conduction between the main terminals being initiated by applying a triggering current to the gate terminal. Means are provided which are responsive to operation of the current switching device to disconnect the load from the power source. The apparatus includes a circuit which is connected to the power load to detect either an improperly polarized connection of the load to the power source or an open ground connection, or both, so as to apply triggering current to the gate terminal of the current switching device, thereby causing the relay contacts to open to protectively disconnect the load from the power source.

The invention accordingly comprises the constructions hereinafter described, the scope of the invention being indicated in the following claims.

In the accompanying drawings, in which several of various possible embodiments of the invention are illustrated.

Corresponding reference characters indicate corresponding parts throughout the several views of the drawings.

Figure 1:
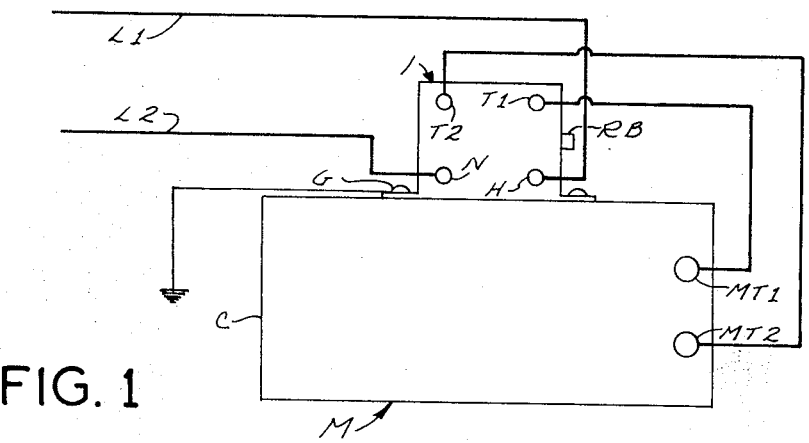
FIG. 1 is a schematic diagram showing protective apparatus of this invention connected to a machine to be protected.

Referring now to FIG. 1, there is indicated at M a machine constituting an electrical power load, including terminals MT1 and MT2 for connecting the machine to a source of AC power by means of a pair of conductors L1 and L2. The machine M is representative of any of various types of machines, appliances or other electrical loads having a case or chassis or other type of cabinet enclosure which is connected to earth ground. Thus, machine M is shown as having a case or chassis C having connection to earth ground made to the case at G. This ground connection may be made through a third wire in the power cable including L1 and L2. In order to insure that there will be no shock hazard resulting from a potential appearing on case C of machine M, it is required that this ground connection be a good, low-impedance connection. The machine M is further representative of an electrical load requiring that, for operational or safety reasons, properly polarized AC power be connected to the load. Accordingly, it is predetermined that terminal MT1 of machine M be connected to the high side (L1) of the AC line and that terminal MT2 be connected to the neutral side (L2).

Indicated generally at 1, protective apparatus of this invention is attached to machine M. It has terminals T1 and T2 connected to terminals MT1 and MT2, respectively, of machine M. A second pair of terminals H and N connect the apparatus (and as will appear, machine M) to the source of power by means of conductors L1 and L2. The ground connection G provides a ground for the protective apparatus 1.

Figure 2:
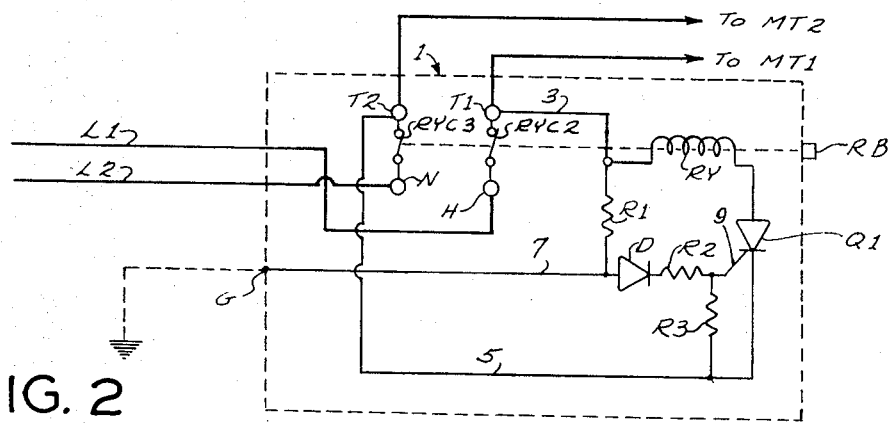
FIG. 2 is a schematic circuit diagram of one embodiment of protective apparatus of the invention.

Referring now to FIG. 2, the protective apparatus includes a contactor or breaker constituted by relay means RY and having a magnetic trip coil and relay contacts RYC2 and RYC3. Contacts RYC2 and RYC3 connect apparatus to the power source by means of a conductor 3 and conductor 5. Contacts RYC2 and RYC3 also connect the motor terminals MT1 and MT2, respectively, to the conductors L1 and L2. The relay RY is adapted to trip when sufficient current flows through its coil, thereby to open the contacts RYC2 and RYC3. To provide for reclosing the contacts after the relay has tripped, the relay is manually resettable by means of a reset button RB which may also serve as a visual indication that the relay contacts have opened. Connected in series with the relay is an SCR Q1 which is of the family of triggerable semiconductor switching devices having main and gate terminals, in which conduction between the main terminals is initiated by applying a triggering current to the gate terminal and is sustainable by internal regenerative action. The serially-connected relay coil and SCR Q1 are connected across conductors L1 and L2 by means of conductor 3 and by a conductor 5 connected to the neutral-side terminal T2. The apparatus is connected to the grounded conductive case C of machine M by means of the ground connection G, represented in FIGS. 2 and 3 by dashed lines. Resistances R1 and R2 and a diode D are connected in series between the high-side conductor 3, to the gate 9 of SCR Q1. The junction between resistance R1 and diode D is connected to ground by means of a conductor 7. A resistance R3 is connected between the gate of SCR Q1 and conductor 5 to the neutral-side terminal T2.

In operation, the apparatus protectively disconnects machine M from the power source if either or both of two conditions occur, i.e., if an open ground connection occurs because case C of machine M does not have a good earth ground connection; or if conductors L1 and L2 are improperly connected to the power source with conductor L2 connected to the high side of the source and conductor L1 connected to the neutral side, so that there is an improperly polarized connection of the load to the power source.

To understand the manner in which the present apparatus operates to disconnect the power load comprising machine M from its source of electric power, it is first assumed that case C is well grounded so that a good earth ground connection is made through conductor 7 and that conductors L1 and L2 are connected with the predetermined proper polarity. That is, the high side (L1) of the power source is connected to terminal H and the neutral side (L2) is connected to terminal N. Considering first the positive half cycle of the AC power waveform, that is, when terminal H is positive with respect to terminal N, current flows through conductor 3, through resistance R1 and conductor 7 to ground. Although SCR Q1 and diode D are forward biased since their anodes are connected to a positive potential by means of the path through conductor 3 and their cathodes are connected to the relatively negative potential by means of conductor 5, no significant triggering current is applied to the gate of SCR Q1 since current is shunted away from diode D by the good ground connection through conductor 7. Accordingly, SCR Q1 is nonconductive and relay RY remains deenergized with contacts RYC2 and RYC3 closed. Machine M therefore remains properly connected through conductors L1 and L2 to the power source. On negative half cycles, SCR Q1 is negatively biased and therefore cannot conduct so that machine M remains connected to the power source.

Assuming that a faulty ground connection of machine case C occurs, i.e., that there is an open in the ground connection, then on positive half cycles current flowing through R1 is no longer shunted to ground but instead may flow through forward-biased diode D, resistance R2 and resistance R3 to the neutral conductor 5. Accordingly, the potential developed across resistance R3 causes a triggering current to be applied to the gate terminal of SCR Q1 to initiate conduction between its main terminals. Relay RY, constituting means responsive to operation of SCR Q1 for disconnecting the load from the power source, thereby trips, its relay contacts RYC2 and RYC3 opening in response to conduction of the SCR Q1 to protectively disconnect machine M and the apparatus from the power source. Accordingly, both the protected machine M and the apparatus will remain deenergized until reset button RB is depressed to reclose the relay contacts.

It is next assumed that the connection through conductor 7 provides a good ground but power conductors L1 and L2 are connected to the power source with improper polarity. Then on negative half cycles conductor 3, being improperly connected to the neutral side of the power source, is positive with respect to conductor 5 (which is improperly connected to the high side of the power source). Since the neutral side of the power source is normally at ground potential, no significant current will flow through conductor 3, and resistance R1 and conductor 7 to ground. However, since conductor 5 is negative with respect to conductor 7 during negative half cycles, diode D becomes forward biased so that current flows through the path comprising diode D and resistances R2 and R3, thereby applying triggering current to the gate terminal of SCR Q1. As a result, relay RY trips, opening the relay contacts to protectively disconnect machine M and the apparatus from the power source.

Assuming that there are both am improperly polarized connection to the power source and an open ground connection, on negative half cycles when conductor 3 is positive with respect to conductor 5, SCR Q1 and diode D become forward biased. Current flow through the path comprising resistance R1, diode D and resistances R2 and R3, since no current can be shunted away by the open ground connection 7. The resulting potential appearing across resistance R3 causes a triggering current to be applied to the gate terminal of SCR Q1. This causes the SCR to become conductive and thereby trip relay RY. Relay contacts RYC2 and RYC3 are thus opened to protectively disconnect machine M and the apparatus from the power supply.

Figure 3:
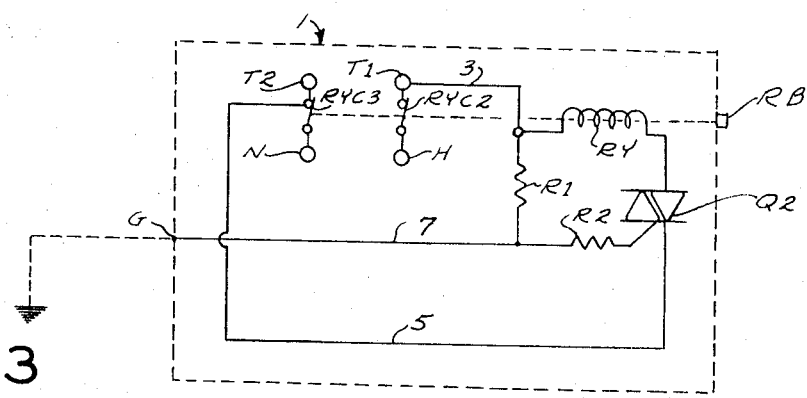
FIG. 3 is a schematic circuit diagram of another embodiment, employing a triac.

In the embodiment shown in FIG. 3, a triac Q2 is used in place of the SCR Q1 of FIG. 2. As is understood by those skilled in the art, a triac is, like an SCR, a triggerable semiconductor current switching device. However, it has the advantage that it may be triggered in either its first or third quadrants of operation, i.e., it may be triggered during either positive or negative half cycles of the AC supply waveform applied across it. Accordingly, its triggering circuit comprises resistances R1 and R2, the junction of the resistances being connected to ground by means of the ground connection through conductor 7.

The FIG. 3 circuit operates in a manner similar to the circuit of FIG. 2. If there is a good earth ground for the case C and if the proper polarity of connection has been made, then current will flow in the path from conductor 3 through resistance R1, and conductor 7. Because of the shunting of this current to ground, insufficient current is applied to the gate of triac Q2 to trigger it and it therefore remains nonconductive and machine M remains connected to the power source. If, however, case C is not well grounded, then no significant current can be shunted to ground through conductor 7. Triac Q2 will accordingly be rendered conductive and thereby operate relay RY which will trip to disconnect machine M and the apparatus from the power source.

If the conductors the conductors L1 and L2 are connected to the power source with the improper polarity such that conductor 3 is connected to the neutral side of the power source and conductor 5 is connected to the high side of the source but there is a good ground connection through conductor 7, then conductors 3 and 7 are at substantially the same potential. Accordingly, no significant current will flow through the path comprising conductor 3, resistance R1 and conductor 7 and a potential difference appears between conductors 7 and 5 thereby permitting gate current to flow into the gate of triac Q2 to cause the triac to become conductive. The relay contacts RYC2 and RYC3 are tripped open and machine M is thereby disconnected from the power source.

Finally, if it is assumed that there is no ground connection through conductor 7 and that the conductors L1 and L2 are connected with the improper polarity, a triggering current can flow in the path from conductor 3 through resistances R1 and R2. This triggers the triac on either half cycle so that it becomes conductive. The relay contacts thereby trip open to protectively disconnect the machine from the source.

As appears from the discussion of the operation of this invention, the apparatus is operative to rapidly disconnect an appliance or machine from its source of power, to safely and reliably prevent a shock hazard or damage to the protected device. By virtue of its simplicity, the apparatus is inexpensive and compact in size.

In view of the above, it will be seen that the several objects of the invention are achieved and other advantageous results attained.

As various changes could be made in the above constructions without departing from the gist of the invention, it is intended that all matter contained in the above description or shown in the accompanying drawings shall be interpreted as illustrative.

I claim:

1. Protective apparatus for disconnecting a faultily grounded or improperly connected power load from a source of electrical power, comprising:

a triggerable semiconductor current switching device having main terminals and a gate terminal, conduction between the main terminals being initiated by applying a triggering current to the gate terminal;

means responsive to operation of the current switching device for disconnecting the load from the power source only in response to conduction between the main terminals of the current switching device; and circuit means including a plurality of conductors connected to the power load and to the source of electrical power and responsive to either an open ground connection or an improperly polarized connection of the load to the power source, or both, one of said conductors being adapted to shunt triggering current to ground in the absence of a faulty ground connection and to effect the application of a triggering current to the gate terminal of the current switching device thereby to protectively disconnect the load from the power source in the presence of a faulty ground connection, and another of said conductors being adapted to conduct triggering current to the gate terminal of the current switching device in response to an improperly polarized connection of the load to the power source to effect disconnection of the load from the power source.

2. Protective apparatus as set forth in claim 1 wherein said means responsive to the operation of the current switching device comprises a relay having contacts for connecting the load to the power source, the relay operating in response to conduction between the main terminals of the current switching device to open the contacts.

3. Protective apparatus as set forth in claim 1 wherein said current switching device comprises an SCR.

4. Protective apparatus as set forth in claim 1 wherein said current switching device comprises a triac.

5. Protective apparatus as set forth in claim 2 wherein said load and said power source are connected by a pair of conductors comprising predetermined high side and neutral side power connections and wherein the main terminals of the current switching device and the relay are serially connected across said conductors, the circuit means applying triggering current to the gate terminal of the current switching device for one polarity of connection of the conductors to the power source but not for the other polarity of connection.

6. Protective apparatus as set forth in claim 5 wherein said circuit means has a connection to ground.

7. Protective apparatus as set forth in claim 6 wherein said ground connection comprises a connection to a grounded conductive case for the load.

9. Protective apparatus as set forth in claim 8 wherein said circuit means further comprises a diode serially connected between said resistances and the ground connection is made to the junction between the resistance connected to the high side power connection and the diode, and wherein a resistance is connected between the gate terminal and the neutral side power connection.

8. Protective apparatus for disconnecting a faultily grounded or improperly connected power load from a source of electrical power, comprising:

a triggerable semiconductor current switching device having main terminals and a gate terminal, conduction between the main terminals being initiated by applying a triggering current to the gate terminal;

means responsive to the operation of the current switching device for disconnecting the load from the power source, comprising a relay having contacts for connecting the load to the power source, the relay operating in response to conduction between the main terminals of the current switching device to open the contacts;

circuit means, having a connection to ground, connected to the load and responsive to either an open ground connection or an improperly polarized connection of the load to the power source, or both, for applying a triggering current to the gate terminal of the current switch thereby to protectively disconnect the load from the power source, said circuit means including a serially-connected pair of resistances, said ground connection being made to their junction, one resistance being connected to the high side power connection, the other resistance being connected to the gate terminal of the current device; and a pair of conductors comprising predetermined high side and neutral side power connections connecting the load and the power source, the main terminals of the current switching device and the relay being serially connected across said conductors, said circuit means applying triggering current to the gate terminal of the current switching device for one polarity of connection of the conductors to the power source but not for the other polarity of connection.

10. Protective apparatus as set forth in claim 2 wherein said relay is manually resettable to reclose the contacts after they have opened.